United States Patent
Burrow et al.

[11] Patent Number: 5,924,730
[45] Date of Patent: Jul. 20, 1999

[54] PRETENSIONING BUCKLE

[75] Inventors: Jon E. Burrow, Clawson; H. John Miller, III, Macomb Township, Macomb County; Michael D. Wilkins, Roseville, all of Mich.

[73] Assignee: Breed Automotive Technology, Inc., Lakeland, Fla.

[21] Appl. No.: 09/024,918

[22] Filed: Feb. 17, 1998

[51] Int. Cl.⁶ .................................................. B60R 23/26
[52] U.S. Cl. ........................................ 280/806; 297/480
[58] Field of Search ................................ 280/806, 801.1; 297/480, 468; 180/268

[56] References Cited

U.S. PATENT DOCUMENTS

| | | | |
|---|---|---|---|
| 4,917,210 | 4/1990 | Danicek et al. | 180/268 |
| 5,487,563 | 1/1996 | Hiramatsu | 280/806 |
| 5,676,397 | 10/1997 | Bauer | 280/806 |

FOREIGN PATENT DOCUMENTS

4227822  2/1994  Germany .................................. 280/806

*Primary Examiner*—Christopher P. Ellis
*Attorney, Agent, or Firm*—Markell Seitzman

[57] ABSTRACT

A safety system comprising: a buckle (22) secured to a pretensioner (20); the pretensioner (20) comprising: a stationary link (102) and stationary block (110); a housing slidably received upon the stationary link (102) and movable relative to the stationary block (110) and a pressure unit for causing the housing, and buckle operatively attached thereto, to move downwardly relative to the stationary block to thereby eliminate slack in a seat belt, and a second link (104) received through the housing for preventing rotation of the housing about the first link (102).

11 Claims, 9 Drawing Sheets

PRETENSIONING BUCKLE

BACKGROUND AND SUMMARY OF THE INVENTION

The present invention generally relates to a safety restraint device for protecting vehicle occupants and more particularly a pretensioning or belt tightening device typically used to tension, i.e. tighten, that portion of the seat belt connected to a buckle.

Pretensioners or belt tighteners, as they are also called, are currently used in industry to operate in conjunction with seat belt buckles. A typical pretensioner for a seat belt retractor or buckle comprises a movable piston joined to a cable. The piston typically moves down a straight tube. The use of the straight tube creates packaging problems within the vehicle as it is difficult to orient the tube within the room that is made available.

It is an object of the present invention to provide a simple, compact and reliable pretensioner that can be used with a seat belt buckle.

Accordingly the invention comprises: a safety system comprising: a buckle secured to a pretensioner; the pretensioner comprising: a stationary link and stationary block; a housing slidably received upon the stationary link and movable relative to the stationary block and a pressure unit for causing the housing, and buckle operatively attached thereto, to move downwardly relative to the stationary block to thereby eliminate slack in a seat belt, and a second link 104 received through the housing for preventing rotation of the housing about the first link.

Many other objects and purposes of the invention will be clear from the following detailed description of the drawings.

DETAILED DESCRIPTION OF THE DRAWINGS

Reference is made to the FIGUREs which illustrate a safety apparatus generally shown as 10 fabricated in accordance with the present invention. The apparatus includes a pretensioner 20 which operates in conjunction with a buckle 22. The buckle 22 is designed to receive a mating tongue 24 which is typically attached to the shoulder belt 26 and seat belt 28 of a typical 3-point safety belt system, which is secured about and protects a vehicle occupant. As is known in the art, there typically will exist slack between the occupant and the safety belt when the belts are positioned about the occupant. The function of the present invention is to cause the buckle 22 to be moved downwardly which pulls the tongue and the attached shoulder belt and lap belt portions of the seat belt system downwardly to eliminate or reduce belt slack about the occupant and/or to introduce a predetermined amount of load into the belt to prevent the occupant from moving forward.

Figure 1:
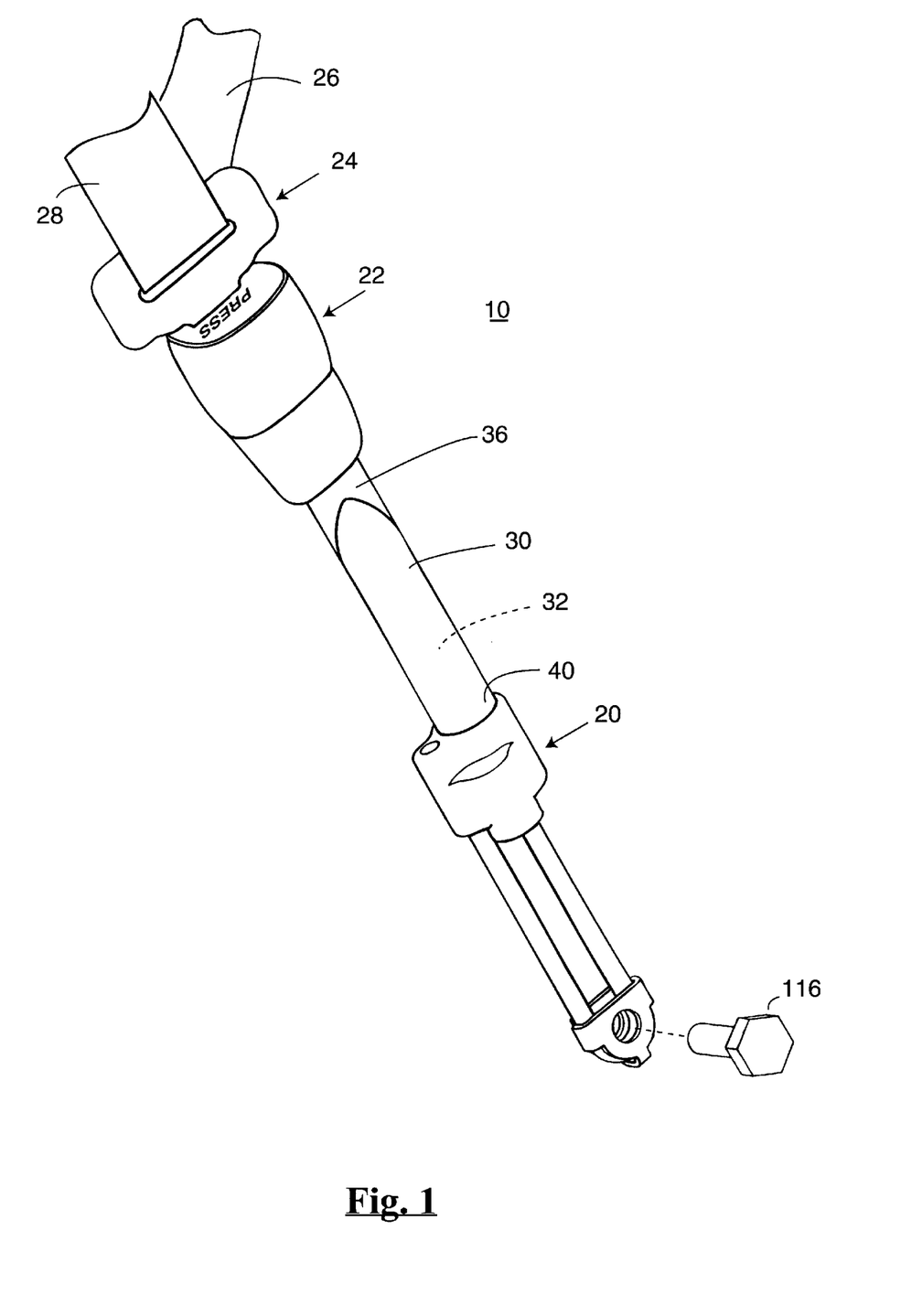
FIG. 1 is an isometric view illustrating an assembled pretensioner, buckle and tongue.
Figure 2:
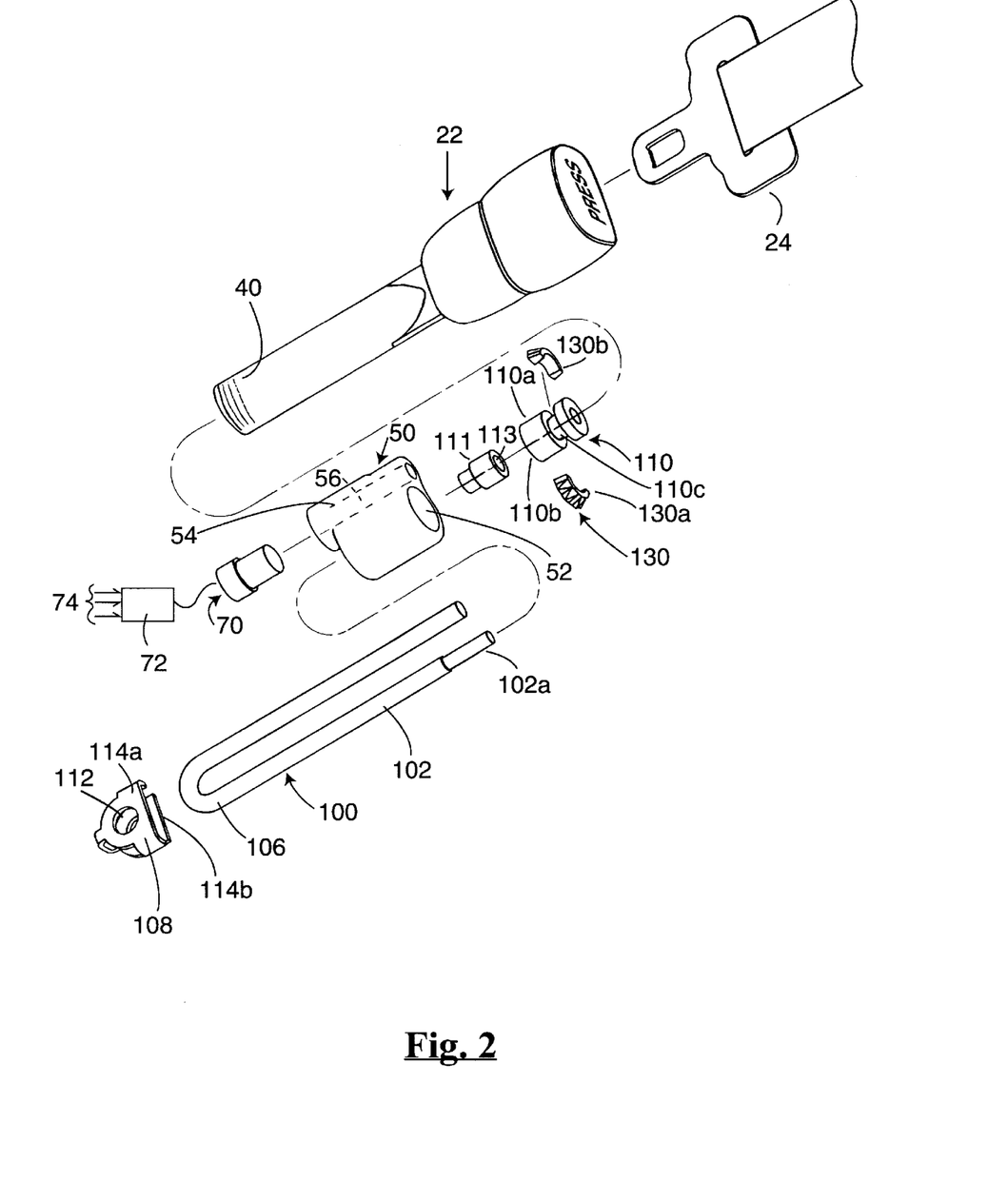
FIG. 2 is an assembly view showing the major components of the present invention.
Figure 3:
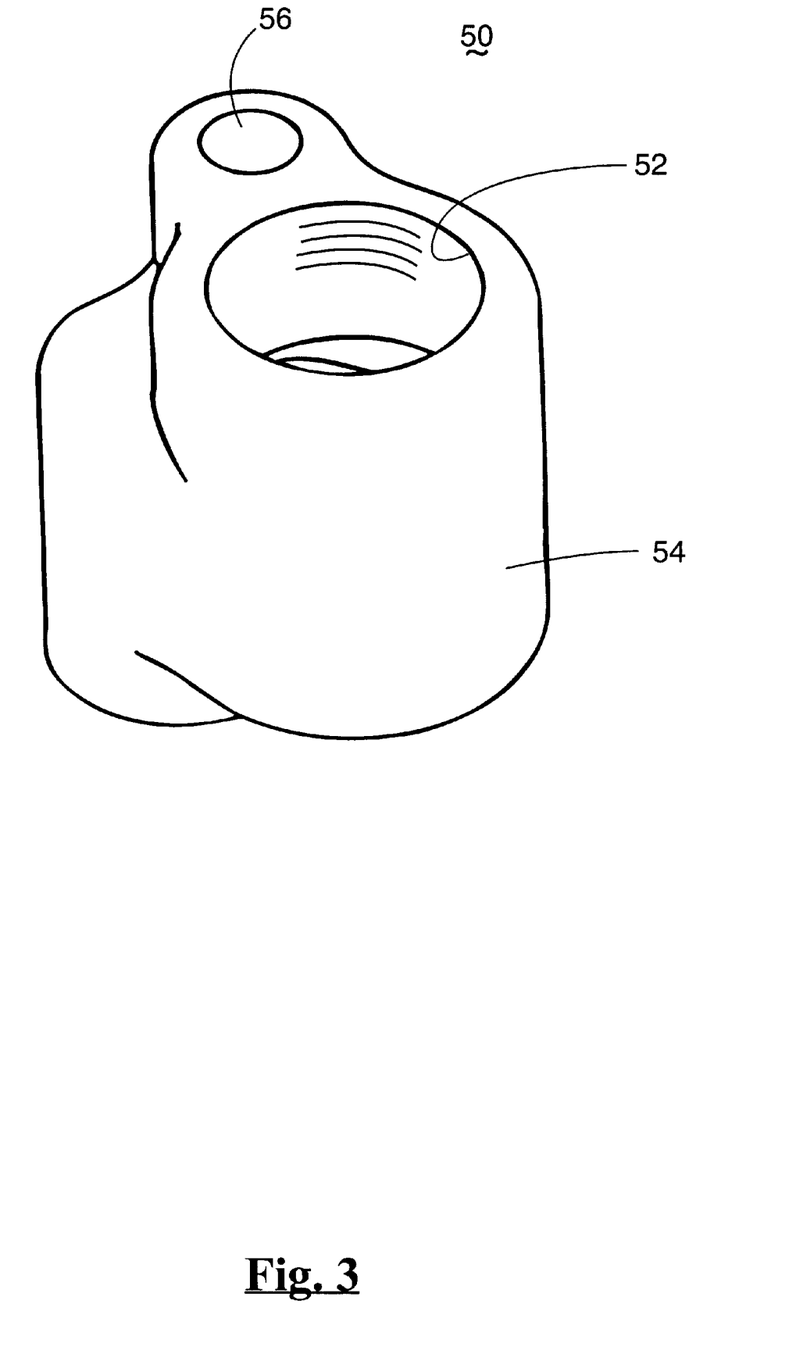
FIGS. 3 and 4 illustrate various views of a housing.
Figure 4:
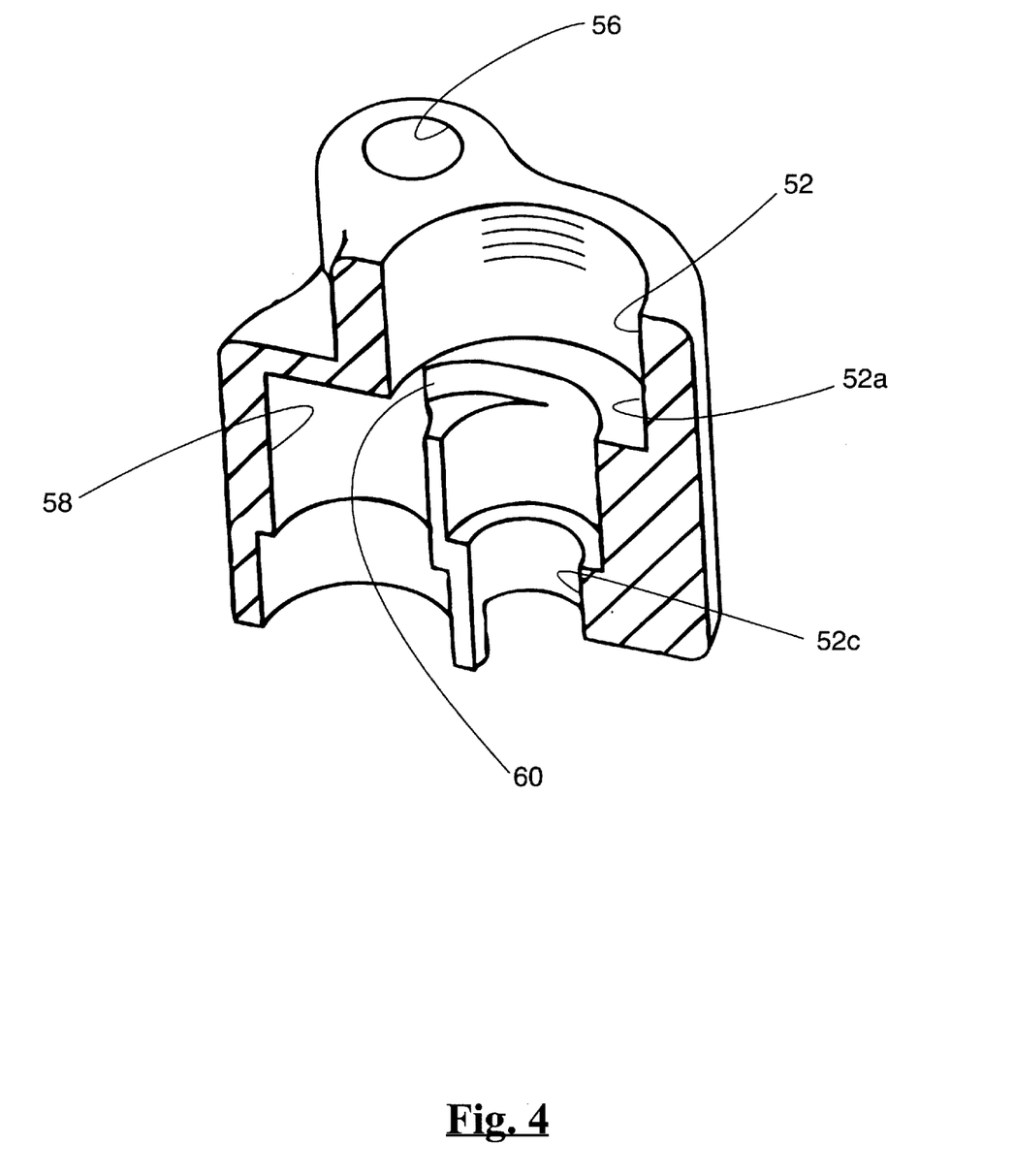
Figure 5:
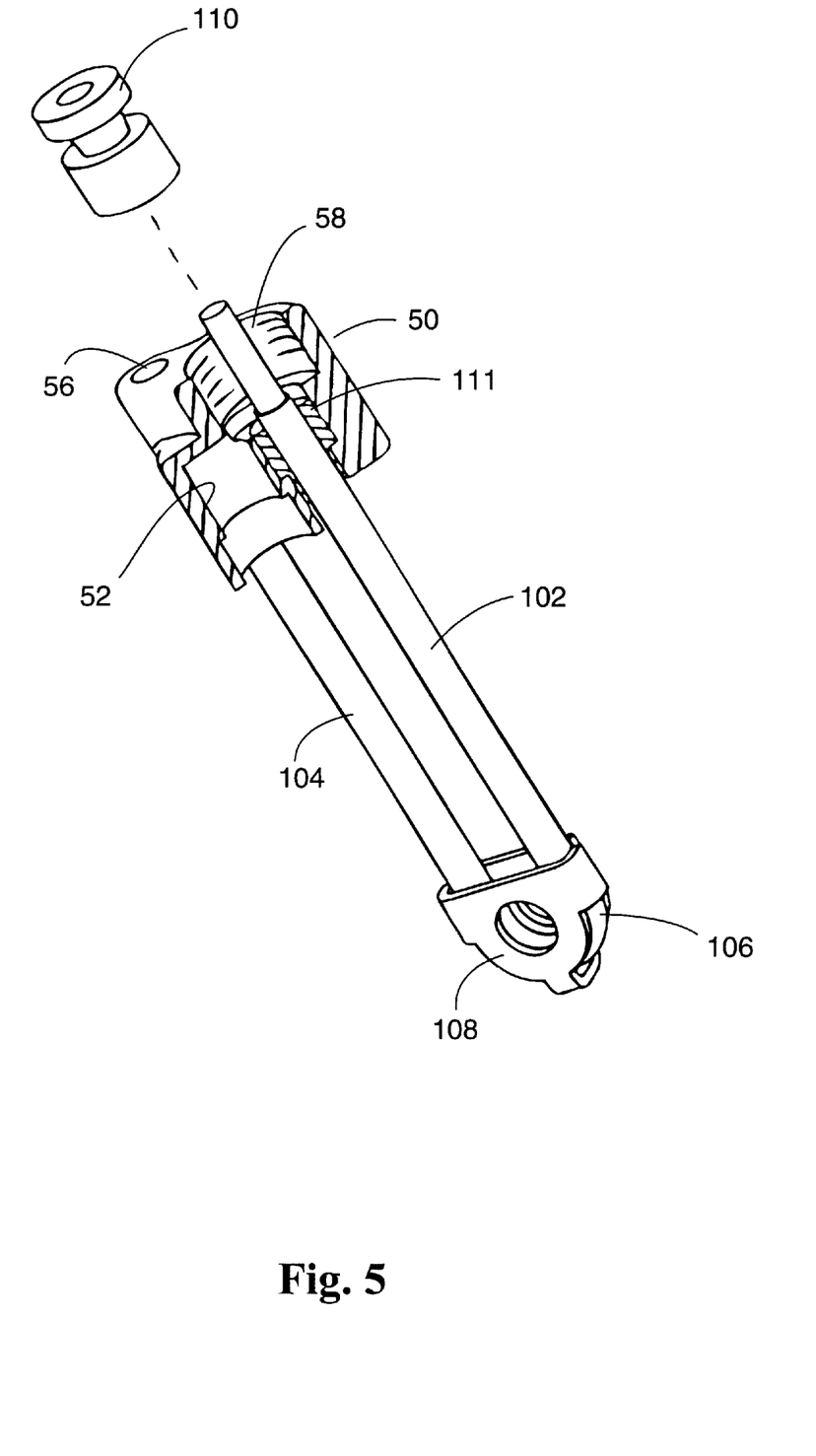
FIG. 5 illustrates a partial sectional/isometric view showing the details of an anchor assembly and housing.

More specifically, and as shown in FIGS. 1, 2, 6 and 7 the pretensioner includes a hollow tube 30 having a central bore 32 and an end 36. The end 36 is typically flattened so that it can be fastened to the frame (not shown) of the seat belt buckle in a known manner. The opposite end 40 of the tube 30 is threaded and received within a complementary sized stepped bore 52 of a housing 50. As can be seen more specifically in FIGS. 3–5, the housing 50 includes a body 54 in which three axially oriented passages or bores are fabricated. The housing 50 also includes a passage 56 and a stepped second bore 58 and a cross passage 60. As can be seen in FIG. 4, bore 58 is communicated to the lower portion of the tube 30 as well as to the lower portion of bore 52 by the cross passage 60. A pyrotechnic element generally shown as 70 is secured, in a known manner, with bore 58. During an accident the pyrotechnic unit 58 will receive a control signal generated by an electronic control unit 72 which is responsive to signals received from one or more crash sensors generally shown as 74. Upon activation of the pyrotechnic unit, products of combustion, including gas and heat, are communicated through passage 60 into the lower regions of the tube 30.

The pretensioner or belt tightener 20 further includes an anchor and a stabilizing assembly generally shown as 100. This assembly 100 includes a first link 102 which may be a square or circular steel rod, upon which is fixedly secured a block or piston 110. The first link 102 is received through passage 52a which is part of bore 52 of the housing 50. The block 110 may be threadably attached to end 102a of the link 102. The assembly 100 additionally includes a second link 104 that is received through passage 56 of the housing 50. While the first and second links 102 and 104 are illustrated as part of the U-shaped assembly 100, it can be appreciated that these two links can be separate.

Nestled into the lower portion 106 of the assembly 100 is a fastener/retainer 108 having an opening 112 therein. The retainer 108 includes opposing sides 114a and 114b which straddle the lower end 106 of the assembly 100. A fastener 116 is received in opening 112 to secure the pretensioner 20 to a structural member of the vehicle such as its floor or B-pillar or to the frame of a vehicle seat.

The block or piston 110 includes a locking member 130, having sections 130a and 130b, which acts as a one-way clutch permitting the unimpeded relative motion between the block 110 and the tube 30 in one direction and either prevents motion in an opposite direction or permits such opposite motion in a controlled manner. Sections 130a and 130b are located within a groove 110c of block 110. This locking member 130 is shown in greater detail in FIG. 8. A seal (such as Nylon or Delrin) 111 having a through bore 113 is located about the top portion of link 102 and is situated in the lower portion 52c of bore 42 (see FIG. 5).

The tube 30 and block or piston 110 are slidable relative to each other. As can be seen the block 110 is received within the inner bore 32 of the tube 30. The lower end 110a of the block 110 is formed with a slightly enlarged outward flange 110b to provide a seal between the block 110 and the bore 32 to prevent gasses from flowing past the block 110.

Figure 6:
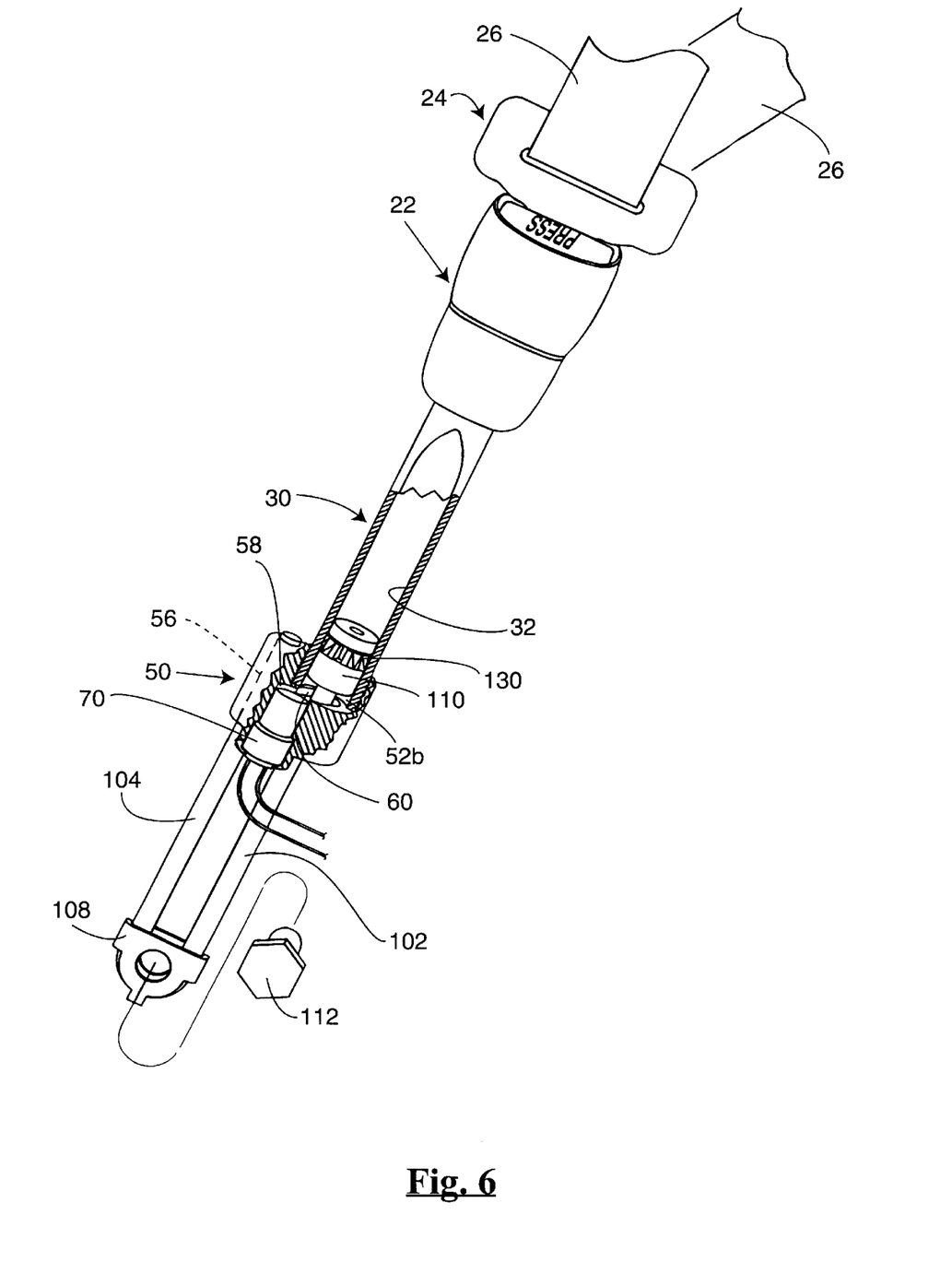
FIG. 6 illustrates the pretensioner in its inactive position.

Reference is now made to FIG. 6 which illustrates the pretensioner in its inactivated mode of operation. As can be seen, the housing 50 is positioned near the top of each of the links 102 and 104. This is the normal position of the buckle 22 and pretensioner. The length of the links 102 and 104 and the length of the tube 30 are chosen such that the buckle 22 is presented at its proper location relative to the vehicle seat so that the occupant can easily attach the tongue 24 to the buckle 22.

Figure 7:
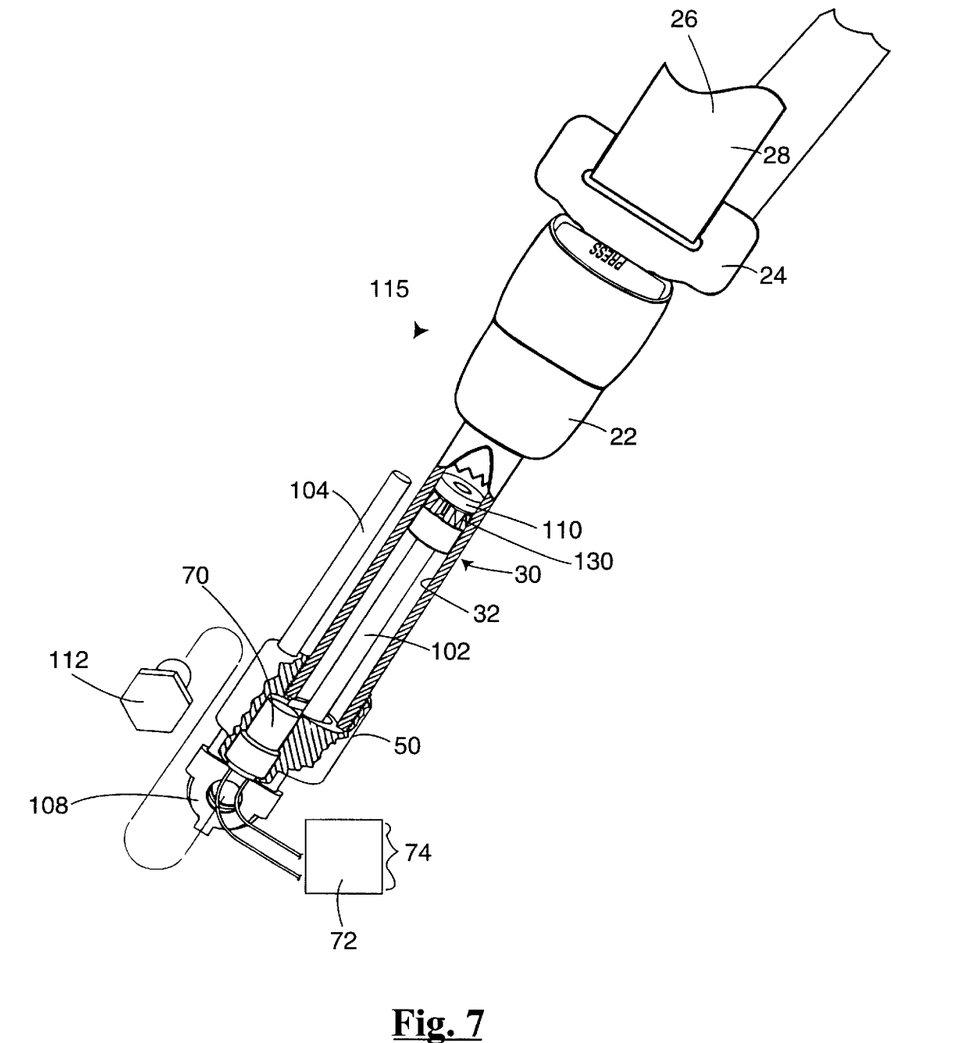
FIG. 7 shows the pretensioner in its activated position.

During a crash event, various sensors 74 located throughout the vehicle will generate signals indicative of the crash. The signals are communicated to the ECU 72 which generates a control signal to activate the pyrotechnic unit 70. Upon activation of the pyrotechnic unit, it produces products of combustion which are communicated to the top portion of bore 58 and then into the cross passage 60. The products of combustion thereafter flow into the housing bore 52 and fill the space 52b between the bore 52 and the lower surface of the block 110. As can be appreciated, this space 52b acts as an expansion chamber. As the products of combustion enter this expansion chamber 52b the housing 50, which is slidably secured relative to the fixed link 102 and block 110, is forced downward on link 102. Since the tube and buckle are physically attached to the housing, the tube and buckle will similarly be pulled downwardly (see arrow 115) to the end of the housing stroke which is illustrated in FIG. 7.

The second link 104, as mentioned above, is slidably received within passage 56. This interconnection prohibits the housing 50 from rotating upon the first link 102. As such, during the activation of the pretensioner 20, the buckle 22 which is attached to the housing 50 via tube 30 will similarly be prevented from twisting.

Reference is again made to FIG. 7 which illustrates the pretensioner in its activated mode of operation. With the pretensioner at the bottom of its stroke, the seat belt portions 26 and 28 attached thereto have been tightly drawn about the occupant, to remove slack, such that the occupant is restricted from moving forward during the initial moments of the crash. However, as the accident progresses, the occupant will tend to move forward thereby applying force to the shoulder and lap belts 26 and 28 which apply an upward force to the buckle 22 tending to urge the buckle 22, tube 30 and housing 50 upwardly. The ensuing upward motion is either prevented or controlled by the interaction of the lock ring 130 with the interior bore or walls 32 of tube 30.

Figure 8:
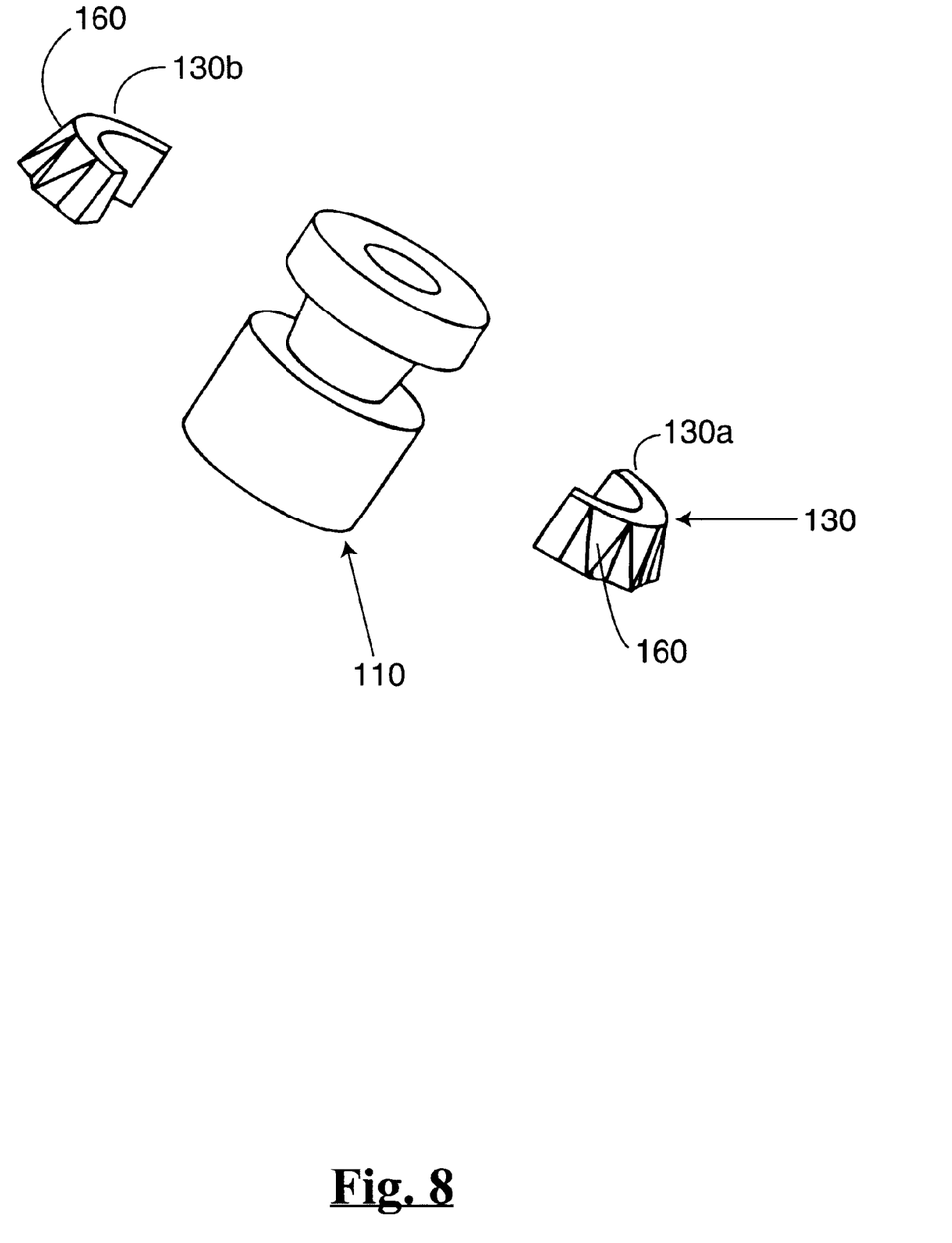
FIG. 8 illustrates a locking ring used in the present invention.

As can be seen from FIG. 8 the lock ring 130 includes a plurality of locking features 160, such as teeth having downwardly pointed ends, which when the tube 30 is caused or urged to move upwardly relative to the stationary block 110, will dig into the wall of the tube 30 (probably made from steel, aluminum). Depending upon the nature of the materials chosen for the tube and locking features 160 and the degree of locking engagement achievable between the lock ring 130 and tube 30, upward motion of the tube 30 will: a) be completely prevented or b) the tube will be permitted to move upwardly in a controlled manner as the locking features 160 cut or extrude metal from the interior bore 32 of the tube. This extruding or cutting of the tube material dissipates crash energy and permits the seat belt buckle (tube 30 and housing 50) to move upwardly in a controlled manner (in response to occupant load), thereby reintroducing into the seat belt system slack in a determinable and controllable manner. The reintroduction of seat belt slack permits the occupant to move forward in a controlled manner as well.

Figure 9:
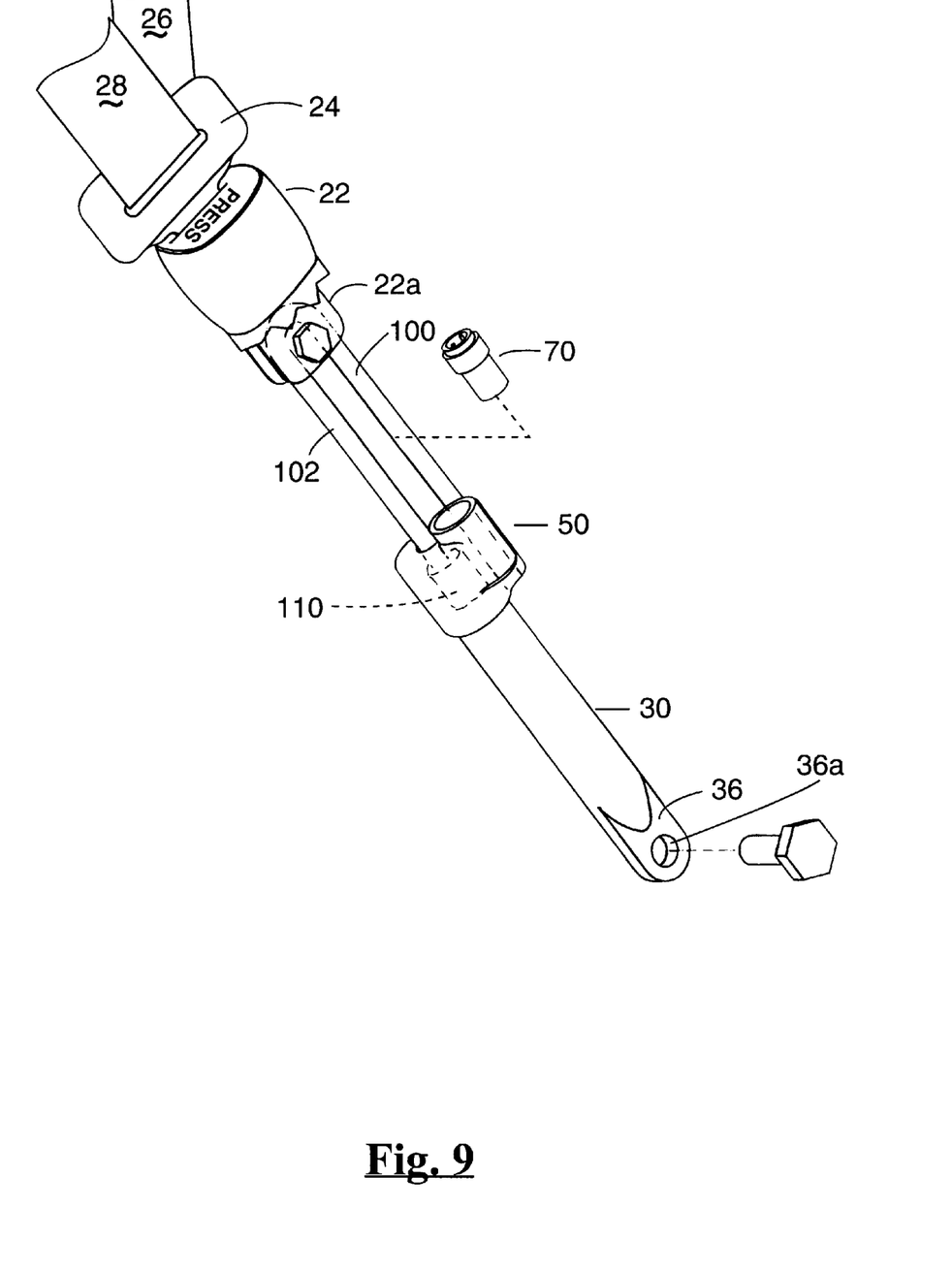
FIG. 9 illustrates an alternate embodiment of the present invention.

Reference is briefly made to FIG. 9 which illustrates an alternate embodiment of the invention. In this embodiment the orientation of the housing 50, assembly 100 and tube 30 are rotated 180°. In this orientation the assembly 100 is now fixedly connected to the frame 22a of the buckle 22. Additionally, the flattened end 36 of the tube 30 includes an opening 36a which is anchored to a structural component of the vehicle or seat in the same manner as is retainer 108. Upon actuation of the pyrotechnic unit 70 the generated products of combustion bear against the piston 110 and the housing. In this embodiment, the housing 50 is fixed as it is anchored to the vehicle via the tube 30. The products of combustion urge the piston 110 (and assembly 100) down the tube 30. As the piston 30 moves downwardly, the buckle 22, which is now fixedly attached to the U-shaped assembly 100, similarly is forced downwardly to reduce or eliminate belt slack and/or load the belt to prevent the occupant from moving forward.

Many changes and modifications in the above-described embodiment of the invention can, of course, be carried out without departing from the scope thereof. Accordingly, that scope is intended to be limited only by the scope of the appended claims.

We claim:
1. A safety system comprising:
   a buckle (22) secured to a pretensioner (20);
      the pretensioner (20) comprising:
         a stationary link (102) and stationary block (110);
         a housing (50) slidably received upon the stationary link (102) and movable relative to the stationary block (110) and
         a pressure unit for causing the housing, and buckle operatively attached thereto, to move relative to the stationary block to thereby eliminate slack in a seat belt attached to the buckle, and
         first means for preventing the rotation of the housing (50) about the first link (102).
2. The device as defined in claim 1 wherein the first means comprises a second link slidably received within a through bore within the housing.
3. The apparatus as defined in claim 1 wherein the pressure unit comprises a pyrotechnic unit (70) which generates upon activation products of combustion including heat and pressurized gas.
4. The apparatus as defined in claim 2 wherein the first and second links are integrally connected.
5. The apparatus as defined in claim 1 including second means for anchoring the first link to a structure.
6. The apparatus as defined in claim 1 including an expansion chamber (52b) between the block (110) and housing (50) to receive pressurized gases generated or produced by the pressure unit.
7. The apparatus as defined in claim 1 wherein a tube is connected at one end to the housing and received about the first link and wherein a second end of the tube is secured to the buckle.
8. The apparatus as defined in claim 1 wherein one of the block (110) and tube (30) include locking means permitting unimpeded motion between the tube and block in one direction and restricted motion in an opposite direction.
9. The apparatus as defined in claim 2 wherein the first and second links are of integral construction.
10. The apparatus as defined in claim 1 including a tongue engagable with the buckle and wherein a portion of the seat belt is attached to the tongue.
11. A safety system comprising:
    a buckle (22) secured to a pretensioner (20); the pretensioner (20) comprising:

a first link (102) and block (110);

a housing (50) through which the first link (102) is slidably received, the housing and block (110) being movable relative to one another; and a pressure unit for generating or providing pressurized gas which is communicated between the housing and the block (110) to cause the housing and block to move relative to one another thus causing the buckle operatively attached thereto, to move to eliminate slack in a seat belt attached to the buckle, and first means for preventing the rotation of the buckle relative to the housing (50) about the first link (102).

* * * * *